(12) United States Patent
Holtman (10) Patent No.: US 11,553,578 B2
(45) Date of Patent: Jan. 10, 2023

(54) LIGHT DEVICE AND A LIGHTING SYSTEM

(71) Applicant: SIGNIFY HOLDING B.V., Eindhoven (NL)

(72) Inventor: Koen Johanna Guillaume Holtman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 188 days.

(21) Appl. No.: 17/259,290

(22) PCT Filed: Jul. 1, 2019

(86) PCT No.: PCT/EP2019/067565
§ 371 (c)(1),
(2) Date: Jan. 11, 2021

(87) PCT Pub. No.: WO2020/011581
PCT Pub. Date: Jan. 16, 2020

(65) Prior Publication Data
US 2021/0274623 A1 Sep. 2, 2021

(30) Foreign Application Priority Data
Jul. 10, 2018 (EP) .................................... 18182743

(51) Int. Cl.
*H05B 47/175* (2020.01)
*H05B 47/16* (2020.01)
*G05B 19/04* (2006.01)
*F21Y 115/10* (2016.01)

(52) U.S. Cl.
CPC .......... *H05B 47/175* (2020.01); *G05B 19/04* (2013.01); *H05B 47/16* (2020.01); *F21Y 2115/10* (2016.08); *G05B 2219/25* (2013.01)

(58) Field of Classification Search
CPC ...... H05B 47/175; H05B 47/16; G05B 19/04; G05B 2219/25; F21Y 2115/10; Y02B 20/40
See application file for complete search history.

(56) References Cited

U.S. PATENT DOCUMENTS

| 8,963,433 B2* | 2/2015 | Jarrell .................... H05B 47/11 315/131 |
| 10,346,657 B1* | 7/2019 | White ................ G06K 7/10099 |
| 11,125,427 B2* | 9/2021 | Trivelpiece .......... H05B 47/105 |
| 2009/0237011 A1 | 9/2009 | Shah et al. |

(Continued)

FOREIGN PATENT DOCUMENTS

| WO | 2015135033 A1 | 9/2015 |
| WO | 2016008989 A1 | 1/2016 |

OTHER PUBLICATIONS

Bilhanan Silverajan et al., "Home Network Security: Modelling Power Consumption to Detect and Prevent Attacks on Homenet Routers," 11th Asia Joint Conference on Information Security, 2016 (8 Pages).

*Primary Examiner* — Borna Alaeddini (57) ABSTRACT

A lighting device comprising a controller arranged to convey a cryptographic message to a load indicative of an instruction for said load to consume an amount of power during a selected time-interval; determine the power consumed during said selected time-interval and determine a condition indicative of an unauthorized load when said determined power is different from one which is expected.

15 Claims, 2 Drawing Sheets

(56) References Cited

U.S. PATENT DOCUMENTS

| | | |
|---|---|---|
| 2010/0283577 A1 | 11/2010 | Koch |
| 2013/0269032 A1 | 10/2013 | Chasko et al. |
| 2014/0210356 A1* | 7/2014 | Jarrell .................. H05B 47/115 |
| | | 315/153 |
| 2016/0270193 A1 | 9/2016 | Lawrenson et al. |
| 2017/0006694 A1* | 1/2017 | Davis ..................... H05B 47/19 |
| 2017/0180141 A1 | 6/2017 | Walden et al. |
| 2018/0322405 A1* | 11/2018 | Fadell ................. H04L 12/2825 |

\* cited by examiner

LIGHT DEVICE AND A LIGHTING SYSTEM

CROSS-REFERENCE TO PRIOR APPLICATIONS

This application is the U.S. National Phase application under 35 U.S.C. § 371 of International Application No. PCT/EP2019/067565, filed on Jul. 1, 2019, which claims the benefit of European Patent Application No. 18182743.7, filed on Jul. 10, 2018. These applications are hereby incorporated by reference herein.

FIELD OF THE INVENTION

The invention relates to a lighting device comprising a power supply, a controller and a power bus. The invention further relates to a lighting system comprising such a lighting device and at least one load. The invention further relates to a load in accordance with said lighting device or said system. The invention further relates to a method of performing at least one action, the method being performed by such a controller comprised by such a power supply of such a lighting device. The invention further relates to a computer program product. The invention further relates, in aspects, to a lighting device comprising a power supply, and relates to a kit of parts.

BACKGROUND OF THE INVENTION

A lighting device comprising a power supply, such as e.g. a driver which connects a mains power supply to a load, is well known in the art. Such a power supply, e.g. a driver, is able to regulate or otherwise control the power provided to the load. Power Line Communication is also known to be applied in respect to such power supplies. Power supplies of this sort are particularly common in lighting.

Power supplies (i.e. drivers) which are capable of providing power to a plurality of loads are becoming increasingly popular in the lighting domain. These power supplies (i.e. drivers) are typically designed to provide power to a primary load (e.g. a light source), and are typically further adapted to connect to one or more auxiliary loads (e.g. pluggable sensors). The connected one or more auxiliary loads may also draw power from the power supply. Due at least to this increasingly popular trend in power supplies (i.e. drivers) capable of providing power to a plurality of loads, there is a desire in the lighting market for improving the functioning and application of such power supplies (i.e. drivers). Hereby, unauthorized loads may be a problem; and unauthorized loads may be undesired. For example, a lighting device manufacturer may only desire their loads, and/or licensed loads of third parties, to be connected to their lighting device; because an authorized load may—contrary to an unauthorized load—safeguard compatibility with the lighting device, ensure safety in operation, prevent undesired tapping of power, prevent any onset of tampering, and/or ensure meeting regulations. Thus, an unauthorized load is undesired and problematic. Therefore, a clear need exists to determine the connection of unauthorized loads to such a power supply (i.e. driver) and/or prevent such unauthorized loads to draw power (i.e. benefit) from such a power supply (i.e. driver).

SUMMARY OF THE INVENTION

It is an object of the invention to provide an improved lighting device, which at least alleviates the problems mentioned above. Thereto, the invention provides a lighting device comprising a power supply, a controller and a power bus; wherein the power supply is adapted to feed the power bus; wherein the power bus comprises a plurality of power outputs, wherein at least one power output of said plurality of power outputs is adapted to electrically connect to respectively at least one load; wherein the controller is arranged to: select a time-interval; convey a cryptographic message to one or more respective load of said at least one load before initiation of said time-interval, wherein the cryptographic message is indicative of an instruction for said one or more respective load of said at least one load to consume an amount of power from the power bus during said selected time-interval; determine the power consumed from the power bus during said selected time-interval; determine a condition indicative of an unauthorized load connected to said power bus when said determined power consumed from the power bus is different to a sum of each amount of power conveyed via the cryptographic message to said one or more respective load of said at least one load; in response to determining said condition, perform at least one action.

Said lighting device comprises a power supply, a controller and a power bus. The lighting device may e.g. be a luminaire. For example, the luminaire may be an upgradable luminaire with sockets to electrically connect plug-in units/devices for additional functionalities. The power bus may, in some examples, be separate from the power supply and/or controller. For example: the power supply may be part of a luminaire, while the power bus may be a separate entity located distant to said luminaire; wherein a power line connection may be present between the power bus and the power supply via which the power bus is fed. The controller may, in some examples, be separate from the power supply and/or power bus. For example: the power supply and the power bus may be part of a luminaire, while the controller may be a separate entity located distant to said luminaire. The controller may for example be located in a bridge, a plug-in unit, or a load, etc. Alternatively, in some examples, said lighting device may be a kit of parts comprising a power supply, a controller and a power bus, which in assembly form a lighting assembly and/or lighting device.

The power supply is adapted to feed (in operation) the power bus, which power bus comprises a plurality of power outputs. Each power output of said plurality of power outputs is suitable for electrically connecting to a respective load. For example, said power output may be a socket to which a respective load may be plugged into. Thus, each power output of said plurality of power outputs may either be free (electrically unconnected to any respective load) or occupied (electrically connected to a respective load). Hence, as mentioned, at least one power output of said plurality of power outputs is adapted to electrically connect to respectively at least one load.

However, a respective load of said at least one load may e.g. either be an authorized load or an unauthorized load. For example, one or more respective loads may e.g. be authorized loads. As discussed, the authorized load may be allowed to be in electrical connection with a power output of the lighting device, whereas an unauthorized load may not be allowed to be so. The present invention advantageously enables the power supply of the lighting device to determine at least one unauthorized load if such an at least one unauthorized load is electrically connected to the power bus of the lighting device. Namely:

The lighting device comprises a controller. In an embodiment, the power supply may for example be comprising the controller. This controller is arranged to select a time-interval. Said time-interval may be a future time-interval, which is e.g. set to initiate at a future point in time. Subsequently, the controller is able to convey a cryptographic message to one or more respective load of said at least one load (i.e. said one or more respective load being e.g. authorized loads). In an embodiment, the controller may alternatively be able to convey a cryptographic message to each respective load of said at least one load.

Said cryptographic message may be a message protected by cryptography. Said conveying may alternatively be considered as distributing. In an embodiment, said controller may create and/or send said cryptographic message to one or more (or alternatively each) respective load accordingly. In another embodiment, said cryptographic message may be received or obtained by the controller and further conveyed to each respective load accordingly. Hence, said cryptographic message may be conveyed via a single hop or a plurality of hops, via no intermediate devices or with intermediate devices. Furthermore, in an embodiment, said cryptographic message may for example be conveyed or sent wirelessly by known wireless communication protocols such as WiFi, ZigBee, Bluetooth, RF, Infrared, VLC, or Ultrasound. In another embodiment, the power bus is adapted to communicate data between the power supply and each respective load of said at least one load (i.e. over the power bus). Hence, the controller is able to convey or send a cryptographic message over the power bus. Such a data communication over a power bus of a lighting device may for example be Power Line Communication (PLC), DALI, a power bus that includes extra wires, separate from the power delivery wires, for e.g. DMX or RS-485 based communication. As another example, the power bus may be a long multi-stranded cable, into which new branch cables can be spliced as needed (e.g. using insulation-displacement connectors) for the purpose of electrically connecting loads.

Further, said cryptographic message is sent before the initiation of said time interval. This cryptographic message is indicative of an instruction for the one or more respective load of said at least one load to consume an amount of power from the power bus during said selected time-interval. Said amount of power may be a predetermined amount of power, or a post-determined amount of power. In the former, said amount of power to be consumed may be predetermined, e.g. by the controller at the installation of the load or dynamically throughout time. In the latter, referring to the post-determined case, said amount of power to be consumed may be determined, e.g. by the one or more respective load of said at least one load, after reception of the cryptographic message (by said one or more respective load) and communicated back to the controller so as to inform the controller what the amount of power consumed has been. In a further embodiment, the cryptographic message comprises an encrypted instruction for one or more (or alternatively each) respective load of said at least one load to consume, when decrypted, a predetermined amount of power from the power bus during said selected time-interval.

As a result, irrespective of being authorized or unauthorized, each respective load of said at least one load may be able to receive and observe said cryptographic message. However, due to the cryptographic message, e.g. because the message being protected by cryptography, or because the cryptographic message comprises the encrypted instruction, only the one or more respective load of said at least one load, which may be classified as one or more authorized load, may be able to read the cryptographic message and/or decrypt said instruction to consume the (e.g. predetermined) amount of power during said selected time-interval. That is: an unauthorized load may be able to overhear a message, but it will not have the cryptographic secrets necessary to allow it to decode the message. Only authorized loads may be equipped with the necessary cryptographic secrets. Consequently, during said selected time-interval, any unauthorized load may not be aware that said time-interval is taking place, or of an instruction to consume an (e.g. predetermined) amount of power.

Further, the controller is adapted to determine the power consumed from the power bus during said selected time-interval. For example, in an embodiment, when the power supply comprises the controller, the controller may be adapted to measure the power consumed from the power bus during said selected time-interval (itself). Alternatively, in an embodiment, the controller may be adapted to receive or obtain or query the power consumed from the power bus during said selected time-interval so as to determine said power consumed. For example, the power supply (or a power meter comprised by the power supply) may communicate such a power consumed from the power bus during said selected time-interval to the controller.

Further, if (or when) this determined (e.g. measured) power is different to a sum of each (e.g. predetermined) amount of power conveyed (e.g. sent) via the cryptographic message to said one or more respective (authorized) load of at least one load, the controller may determine a condition; which condition is indicative of a power consumption over the power bus that deviates from the power consumption (pre-)agreed with authorized loads. Hence, said condition may indicate an unauthorized load drawing power from the power bus during said selected time-interval. Consequently, to cope with such an undesired condition, in response to determining said condition, the controller may be arranged to perform at least one action. Such an action may for example be a corrective action or a reporting action.

Hence, all in all, by cryptographically agreeing with authorized loads to consume an amount of power over the power bus during a selected time-interval, and by determining (or e.g. measuring or monitoring) whether the actual power consumption over the power bus differs from the agreed amount of power consumption, wherein the amount of power may e.g. be a predetermined amount of power, a condition may be determined which is indicative of an unauthorized load drawing power from the power bus. The lighting device according to the invention is advantageous because it may autonomously determine whether a condition exists indicative of an unauthorized load connected to its power bus; and based thereon act accordingly.

Namely: In an embodiment, the at least one action may comprise sending a notification signal. Such a notification signal may advantageously report the condition, e.g. to a lighting device owner. Such a notification signal may for example serve as an input to a transceiver, which sends a corresponding notification message to e.g. a backend server, a bridge or a mobile communications device. Said sending may either be performed via wired connections or wirelessly such as RF, Bluetooth, ZigBee, or Visible Light Communication (VLC). The notification signal and/or notification message may therefore be indicative of an unauthorized load connected to the power bus. Said notification signal may therefore be an alarm signal.

Moreover, in an embodiment, the at least one action may comprise changing an amount of power fed to the power bus by the power supply. Such a change may prevent unauthorized loads to benefit fully from drawing power from the power bus by changing to a less favorable power regime. Furthermore, in an embodiment, said amount of power fed to the power bus by the power supply may be zero. As an unauthorized load may not be safeguarding safety standards, such a change in the amount of power fed to the power bus being zero may be advantageous, because power fed to the power bus may be shut off.

In an alternative embodiment, said changing an amount of power fed to the power bus by the power supply may be oscillating. Thus, an oscillating power is provided, e.g. to counteract an optimal operation of an unauthorized load and/or a power bus with an unauthorized load connected thereto.

In an alternative embodiment, if the load may be a light source, said amount of power fed to the power bus may be a power-regime causing a Visible Light Communication signal to be emitted by said light source, which VLC signal may be indicative of the condition, e.g. the signal may be a coded light message indicating an unauthorized load has electrically connected to the lighting device/power bus.

In an alternative embodiment, the at least one action performed by the controller may comprise sending (via e.g. a transceiver) a request to a respective load of the at least one load for identifying itself to the controller. Thus, the controller may actively perform a check for identifying said respective loads. Performing such a request may increase the security of the lighting device even more.

Here, as mentioned, the condition is determined when said measured power consumed from the power bus is different, or phrased as essentially or substantially different, to a sum of each (e.g. predetermined) amount of power conveyed via the cryptographic message to said one or more respective load of said at least one load. Said condition may for example be phrased as an unauthorized condition.

As mentioned, at least one power output of said plurality of power outputs is adapted to electrically connect to respectively at least one load. For example, said power output may be a socket to which a respective load may be plugged into. Thus, said plurality of power outputs may provide sensing, control, communication or monitoring capabilities for the lighting device. Hence, in an embodiment, the at least one load may comprise a sensor. The sensor may be a sensor unit. The at least one load may for example be a plug-in unit. Such a sensor may for example be one of: a microphone, a camera, an RF transceiver, a Bluetooth transceiver, a ZigBee transceiver, a PIR sensor, an IR sensor, a smoke-detector, a push-button, a user-input device, a pressure sensor, or a humidity sensor, a device combining several of these modalities, etc. Moreover, in an embodiment, the at least one load may comprise an actuator. For example, in a further embodiment, the at least one load may comprise a light source. Such an actuator may for example be one of: a speaker, an RF beacon, an IR beacon, a VLC beacon, a display device, a mechanical actuator, a RADAR, a LIDAR, or a fan, etc. Such a light source may for example be a LED light source, an OLED light source, a semiconductor light source, a T-LED, a LED module, a LED strip, a conventional light source, an incandescent lamp, a fluorescent lamp, a retrofit lamp, a spot light, a halogen spot, etc.

Furthermore, said power supply may be a lighting driver. Said power bus may for example be a DALI bus, a DMX bus, or combined power and $I^2C$ communication bus. In some examples, the power supply (e.g. lighting driver) may comprise a pair of wires which run to the power bus and its plurality of power outputs, which use a DALI bus protocol that combines the power delivery and bidirectional communication facilities over just this pair of wires. In another examples, there may be four wires running through the power bus and its plurality of power outputs, two wires being power and ground wires, and the other two wires being used for bidirectional communication, using an electrical protocol such as UART, USB, or $I^2C$.

The cryptographic message according to the invention may be sent either via broadcast over the power bus to the at least one load, or via unicast to each respective load of said at least one load separately.

As mentioned, the cryptographic message may comprise an encrypted instruction for one or more respective load of said at least one load to consume, when decrypted, a predetermined amount of power from the power bus during said selected time-interval. Said cryptographic message may be established by encrypting said instruction with known encryption technologies. For example, the cryptographic message or the encrypted instruction may be encrypted with a secret key, and may be only be decrypted with knowledge about said secret key. Said secret key may be present in an authorized load, for example because the authorized load may be manufactured by the same manufacturer of the lighting device or e.g. a third party licensed to equip their products with said secret key.

Said (e.g. predetermined) amount of power may differ from the amount of power one or more respective load of said at least one load draws from the power bus in normal operation outside said selected time-interval. Therefore, (directly or indirectly) instructing said one or more respective load of said at least one load to consume the (e.g. predetermined) amount of power from the power bus may cause said one or more respective load to receive/draw a non-optimal amount of power. It may therefore be advantageous to shorten said time-interval. Hence, in an embodiment, a duration of said time-interval is less than 1 second, preferably less than 10 milliseconds, such as e.g. 1 millisecond. Such a small time-duration of said time interval ensures that the normal operation of each respective load of said at least one load is essentially not affected by the instruction to consume an (e.g. predetermined) amount of power. Such a short time-duration may be beneficially exploited in the design of the load to ensure normal operation. Therefore, in examples, the duration of said time-interval may be proportional to a capability of an energy storage means of a respective load to provide the respective load with power when power provided by the power output is cut. Such an energy storage means may be a capacitor or a battery.

In an aspect, for example, said duration of said time-interval may be proportional to a capacitor size of each respective load of said at least one load. Namely, for example, when instructing each respective load to e.g. consume zero predetermined amount of power, such a capacitor in said respective load may compensate the time no power is fed to the respective load. Hence, said time duration may be made proportional to such a capacitor size, in order to match said selection of said time-interval to the capacitor present in said respective load.

For a load that is a light source, if the time-interval is very small, the load can be designed so that less light than normal is emitted during the time-interval in order to save energy, but with the temporary drop in light output being so short and small that it is not observable to the human eye.

In some embodiments, said time-interval may be selected at set times, e.g. each future day at eight o'clock. Hence, in some examples, said time-interval may be selected periodically. In an embodiment, the controller is arranged to select said time-interval randomly in time. Such a random selection of said time-interval may make it harder to anticipate (by e.g. unauthorized loads) on which moments the controller monitors for said condition (as mentioned). Thus, more robustness may thereby be introduced into determining said condition.

According to the invention, in a simple exemplar case, the (e.g. predetermined) amount of power may be zero. In such a case, measuring any power consumed from the power bus during said selected time-interval may indicate said condition of an unauthorized load being present and drawing power from the power bus. This is a straightforward way to determine said condition. Hence, in an embodiment, the amount of power is less than 0.01 Watt. As mentioned before, said amount of power may be the predetermined amount of power.

In an embodiment, the lighting device according to the invention may further comprise a primary power output adapted to connect to a primary load, wherein the primary load is a light source (or at least one light source), wherein the power supply further adapted to feed the primary power output. Hereby, the power bus according to the invention serves an auxiliary power output, for example to connect sensors which facilitate the operation of the primary load, i.e. a light source. In a further embodiment thereof, a maximum power provided to the primary power output may be greater than a maximum power fed to the power bus. For example, five or ten times greater. Moreover, in yet a further embodiment thereof, the at least one action may be an action in respect of the primary load; e.g. in response to determining said condition, shut of power to said primary load (because it may e.g. be identified that said primary load is using unauthorized loads/devices, which may be undesired.

In an example, whenever the primary load is a light source, the at least one load is a sensor, which sensor may render sensor measurements for facilitating the operation of the light source.

Moreover, the auxiliary power output may provide power to a respective auxiliary load. Such an auxiliary load may provide features to the primary load, but may also provide sensing, control, communication features that are not related to a function of the primary load. Particular embodiments envisage that lighting systems can act as convenient hosting platforms for sensors and communication devices that fulfill other needs of the people or devices in the vicinity of the driver, such as a need to monitor the air quality in a building.

It is a further object of the invention to provide an improved lighting system, which at least alleviates the problems and disadvantages mentioned above. Thereto, the invention further provides a lighting system comprising: a lighting device according to the invention, and at least one load; wherein each respective load of the at least one load is electrically connected to respectively the at least one power output of said plurality of power outputs.

In an embodiment, the at least one load comprises a light source and/or a sensor. In an embodiment, the lighting device may further comprise a primary power output adapted to connect to a primary load, wherein the power supply further adapted to feed the primary power output; wherein the lighting system further comprises a primary load, wherein the primary load is a light source.

The advantages and/or embodiments applying to the lighting device according to the invention may also apply mutatis mutandis to the present lighting system according to the invention.

It is a further object of the invention to provide an improved load, which at least alleviates the problems and disadvantages mentioned above. Thereto, the invention further provides A load for connecting to a power output of a power bus; wherein the load comprises a load controller for receiving a cryptographic message indicative of an instruction for the load to consume a predetermined amount of power from said power bus during a selected time-interval; wherein the load controller is configured to decrypt said cryptographic message. In an embodiment, the load controller comprises a secret key for decrypting said cryptographic message. In an embodiment, the load is a sensor or an actuator, preferably a light source. In an embodiment, the load is arranged for power line communication over said power bus. For example, the load controller may be compatible to perform power line communications, or alternatively wireless communications, with a controller of a lighting device or lighting system. The load may in some examples comprise a memory for holding a license. Said load is thus compatible with said lighting device or said system. In an embodiment, the load comprises a load controller for receiving a cryptographic message comprising an encrypted instruction for the load to consume, when decrypted, a predetermined amount of power from said power bus during a selected time-interval It is a further object of the invention to provide an improved method of performing at least one action, within the context of the present invention, which at least alleviates the problems and disadvantages mentioned above. Thereto, the invention further provides a method of performing at least one action, the method being performed by a controller of a lighting device, wherein the lighting device comprises a power supply and a power bus, wherein the power supply is adapted to feed the power bus, wherein the power bus comprises a plurality of power outputs, the method comprising: selecting a time-interval; conveying, before initiation of said time-interval, a cryptographic message to one or more respective load of at least one load, wherein the at least one load is respectively electrically connected to at least one power output of said plurality of power outputs, wherein the cryptographic message is indicative of an encrypted instruction for said one or more respective load of said at least one load to consume an amount of power from the power bus during said selected time-interval; determining the power consumed from the power bus during said selected time-interval; determining a condition indicative of an unauthorized load connected to said power bus when said determined power consumed from the power bus is different to a sum of said one or more amount of power conveyed via the cryptographic message to said one or more respective load of said at least one load; in response to determining said condition, performing the at least one action.

In an embodiment, said conveying may be sending, e.g. sending a cryptographic message comprising an encrypted instruction for the load to consume, when decrypted, a predetermined amount of power from said power bus during a selected time-interval. In an embodiment, the at least one action comprises sending a notification signal and/or comprises changing a power fed to the power bus by the power supply. In an embodiment, a duration of said time-interval is less than 1 second, preferably less than 10 milliseconds. In an embodiment, said controller is comprised by the power supply, and said determining the power consumed from the power bus during said selected time-interval is measuring the power consumed from the power bus during said selected time-interval. In an alternative embodiment, said controller may be a separate entity, wherein the lighting device is phrased as a kit of parts of a lighting assembly or a lighting system.

The advantages and/or embodiments applying to the lighting device and/or the lighting system according to the invention may also apply mutatis mutandis to the present method according to the invention.

The invention further relates to a computer program product. Hence, the invention provides a computer program product for a computing device, the computer program product comprising computer program code to perform the method according to the invention when the computer program product is run on a processing unit of the computing device. For example, said computing device may be the controller according to the invention comprised within the lighting device.

Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Considering the above, in an embodiment, there is provided: a lighting device comprising a power supply and a power bus; wherein the power supply is adapted to feed the power bus and comprises a controller; wherein the power bus comprises a plurality of power outputs, wherein at least one power output of said plurality of power outputs is adapted to electrically connect to respectively at least one load, and wherein the power bus is adapted to communicate data between the power supply and each respective load of said at least one load; wherein the controller is arranged to: select a time-interval; send a cryptographic message to each respective load of said at least one load before initiation of said time-interval, wherein the cryptographic message comprises an encrypted instruction for each respective load of said at least one load to consume, when decrypted, a predetermined amount of power from the power bus during said selected time-interval; measure the power consumed from the power bus during said selected time-interval; determine a condition when said measured power consumed from the power bus is different to a sum of each predetermined amount of power sent via the cryptographic message to each respective load of said at least one load; in response to determining said condition, perform at least one action. The advantages and/or embodiments applying to the lighting device and/or the lighting system according to the invention may also apply mutatis mutandis to the present lighting device according to the invention. Similarly, a method of performing at least one action corresponding to this embodiment may mutatis mutandis be provided. Hence, in an embodiment, A method of performing at least one action is provided, the method being performed by a controller comprised by a power supply of a lighting device, wherein the lighting device comprises the power supply and a power bus, wherein the power supply is adapted to feed the power bus, wherein the power bus comprises a plurality of power outputs, the method comprising: selecting a time-interval; sending, before initiation of said time-interval, a cryptographic message to each respective load of at least one load, wherein the at least one load is respectively electrically connected to at least one power output of said plurality of power outputs, wherein the cryptographic message comprises an encrypted instruction for each respective load of said at least one load to consume, when decrypted, a predetermined amount of power from the power bus during said selected time-interval; measuring the power consumed from the power bus during said selected time-interval; determining a condition when said measured power consumed from the power bus is different to a sum of each predetermined amount of power sent via the cryptographic message to each respective load of said at least one load; in response to determining said condition, performing the at least one action.

Moreover, in an aspect of the invention, in a paragraph, there is provided: a kit of parts comprising a power supply according to the invention (as described in the embodiments and examples above as comprised by the lighting device) and a power bus according to the invention (as described in the embodiments and examples described above as comprised by the lighting device); wherein the kit of parts forms, in assembly, a lighting assembly and/or a lighting device.

In an aspect of the invention, in a paragraph, there is provided: a lighting device comprising a power supply and a controller; wherein the power supply is adapted to feed a power bus; wherein the power bus comprises a plurality of power outputs, wherein at least one power output of said plurality of power outputs is adapted to electrically connect to respectively at least one load; wherein the controller is arranged to: select a time-interval; send a cryptographic message to each respective load of said at least one load before initiation of said time-interval, wherein the cryptographic message comprises an encrypted instruction for each respective load of said at least one load to consume, when decrypted, a predetermined amount of power from the power bus during said selected time-interval; determine the power consumed from the power bus during said selected time-interval; determine a condition when said determined power consumed from the power bus is different to a sum of each predetermined amount of power sent via the cryptographic message to each respective load of said at least one load; in response to determining said condition, perform at least one action. The advantages and/or embodiments applying to the lighting device and/or the lighting system according to the invention may also apply mutatis mutandis to the present lighting device according to the invention.

BRIEF DESCRIPTION OF THE DRAWINGS

The invention will now be further elucidated by means of the schematic non-limiting drawings.

DETAILED DESCRIPTION OF THE EMBODIMENTS

As mentioned, an unauthorized load, which is in electrical connection with a power output of a lighting device, may be undesired and problematic. The present invention enables a lighting device to determine at least one unauthorized load if such an at least one unauthorized load is electrically connected to the power bus of (or associated with) the lighting device. This determination is hereby performed by the insight of cryptographically agreeing with authorized loads to consume an amount of power (e.g. a predetermined amount of power) during a selected time-interval, and by subsequently determining (e.g. by measuring/monitoring) an actual power consumption. If said actual power consumption differs from the agreed amount of power consumption, then a condition may be determined which is indicative of an unauthorized load drawing power. In response to such a determined condition, at least one action may be taken by the lighting device.

Figure 1:
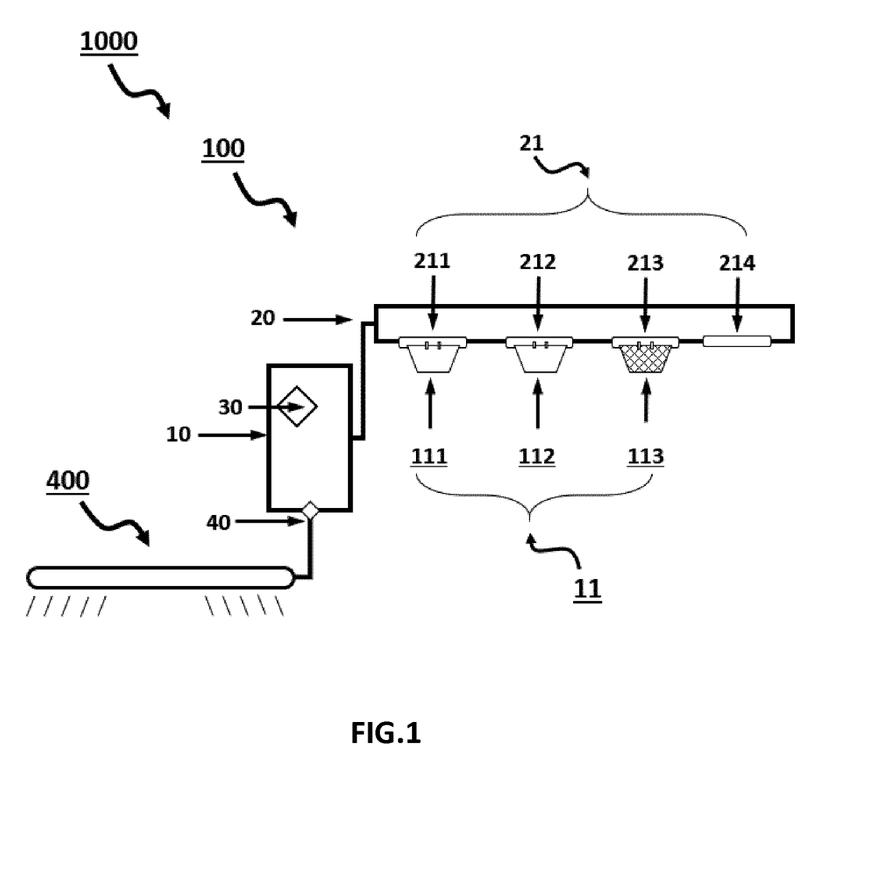
FIG. 1 depicts schematically an embodiment of a lighting system comprising a lighting device and at least one load.

FIG. 1 depicts schematically, by non-limiting example, an embodiment of a lighting system 1000 comprising a lighting device 100 and at least one load 11. The lighting device 100 is a luminaire with a power supply 10, which power supply 10 is a lighting driver. Said lighting device 100 may either be part of outdoor lighting such as street lighting or indoor lighting such as office lighting.

The power supply 10 feeds a power bus 20. Said power bus may for example be a DALI bus. Said bus may alternatively be a bus combining power delivery wires (e.g. VDD and GND wires) with DMX signaling on DMX wires, or a bus combining power delivery wires with $I^2C$ signaling on $I^2C$ wires. Furthermore, in alternative examples, the power bus may be separate from the power supply, that is: in a separate enclosure. For example, the power supply may be present within a luminaire, while the power bus to which the power supply is connected via wiring is present within a separate enclosure, such as in a ceiling element distant from the luminaire.

In an alternative example, the power bus may be a long multi-stranded cable, into which new branch cables can be spliced as needed (e.g. using insulation-displacement connectors) for the purpose of electrically connecting loads. When multiple loads are connected to the power bus, they will typically be connected to form parallel circuit: this greatly eases the design of the bus and the loads. However, this invention may also consider the option that two loads may be connected in series to consume the voltage supplied by the power supply, in particular that an unauthorized load may be connected to the bus in series to an authorized load. To realize such a collection in series, the attacker placing the unauthorized load may have to physically open the enclosure of the bus (if present), to gain access to the bus wires inside the enclosure.

Here, the power supply 10 also feeds a primary power output 40. The primary power output 40 is adapted to connect to a primary load 400. The primary load 400 is part of the lighting system 1000 and is a TLED lamp 400. Alternatively, said primary load may be any other conventional light source, incandescent light source, LED light source, halogen light source, etc. Alternatively, said primary load, i.e. the TLED lamp, may be a plurality of lamps.

The power bus 20 serves as an auxiliary power output of the power supply 10. Therefore, the maximum power provided to the primary power output 40 is at least five times greater than a maximum power fed to the power bus 20. Hence, the power supply 10, i.e. the lighting driver, comprises a primary power output and an auxiliary power output. Alternatively, other shares between the primary and auxiliary power output may be envisioned as long as the primary power outputs has a greater maximum power than the auxiliary power output. Here, the function of the power bus 20 is to facilitate the operation of the TLED lamp 400 and provide (auxiliary) power to sensors which add presence detection functionality to said TLED lamp 400. Alternatively or additionally to presence detection, other functionalities may be envisioned, such as sensing, control, communication or monitoring capabilities for the lighting device. Alternatively or additionally, sensors may be actuators and/or transceivers. Thus, in alternative embodiments, depending on functionality, such a sensor may for example be one of: a microphone, a camera, an RF transceiver, a Bluetooth transceiver, a ZigBee transceiver, a PIR sensor, an IR sensor, a smoke-detector, a push-button, a user-input device, a pressure sensor, or a humidity sensor, or a combination thereof, or a device combining multiple sensors and/or actuators, etc. Yet alternatively, said auxiliary output may also serve to electrically connect actuators, e.g. transceivers, light sources (e.g. for signaling) or sound speakers.

Referring to FIG. 1, the power bus 20 comprises a plurality of power outputs 21. Each power output 211, 212, 213, 214 of said plurality of power outputs 21 is suitable for electrically connecting to a respective load 111, 112, 113. The plurality of power outputs 21 are sockets for plugging in sensors, or plug-in units/modules. Alternatively, said sockets may be other means for electrically connecting loads. Here, four power outputs 211, 212, 213, 214 are depicted. The first power output 211 of the plurality of power outputs 211, 212, 213, 214 is electrically connected to a first respective load 111 of said at least one load 11. The first respective load 111 is a microphone for detecting presence. The second power output 212 of the plurality of power outputs 211, 212, 213, 214 is electrically connected to a second respective load 112 of said at least one load 11. The second respective load is a PIR sensor for detecting presence. The third power output 213 of the plurality of power outputs 211, 212, 213, 214 is electrically connected to a third respective load 113 of said at least one load 11. The third respective load is a microwave sensor for detecting presence. The fourth power output 214 of the plurality of power outputs 211, 212, 213, 214 is kept free and is not electrically connected to any load, but is nevertheless suited therefor, e.g. to connect to a camera. Hence, as mentioned, at least one power output 211, 212, 213 of said plurality of power outputs 21 is adapted to electrically connect to respectively at least one load 111, 112, 113. Alternatively, as mentioned, the at least one load may be any other suitable sensor within the context of the invention or e.g. within the functionality of the primary load.

Here, in this exemplar case, in order to accurately detect presence in a room, the luminaire requires said microphone, PIR sensor and microwave sensor to be compatible with each other and therefore to be authorized in order to safeguard quality in presence detection; which is relevant in case of e.g. emergencies such as fire. Still referring to FIG. 1, said microphone 111 and said PIR sensor 112 are both authorized devices (in respect to their interaction with the luminaire), e.g. authorized by the luminaire manufacturer or by a standardization organization. However, said microwave sensor 113 is not authorized (hence depicted with a texture in FIG. 1) and is prone to wrongful and/or inaccurate readings. The luminaire manufacturer does e.g. not want the power supply 10 of the lighting device 10 to feed power to said unauthorized microwave sensor 113. Therefore, it is one objective to determine such an unauthorized device or load.

Still referring to FIG. 1, the present invention advantageously enables the power supply 10 of the lighting device 100 to determine at least one unauthorized load (i.e. the microwave sensor 113) if such an at least one unauthorized load (i.e. the microwave sensor 113) is electrically connected to the power bus 20 of the lighting device 10. Namely:

The power bus 20 is adapted to communicate data between the power supply 10 and each respective load 111, 112, 113 of said at least one load 11. This data communication is by known means and protocols of Power Line Communication over the bus, which encompasses e.g. bidirectional communication. Alternatively, other communication means over the powerline or a data line in the power bus may also be envisioned. Yet alternatively, in some examples (not depicted), wireless communication may be established directly from a power supply controller (and an associated transceiver) and the respective load. Hence, the load may comprise a transceiver.

The power supply 10 of the lighting device 100 further comprises a controller 30. Alternatively, the controller may be comprised by the lighting device or be a separate entity, or have distributed intelligence. This controller 30 selects a time-interval, which is set to initiate at a future point in time. Here, said time-interval initiates periodically at eight o'clock each morning. Alternatively, said time-interval may be selected randomly in time, e.g. at random times during each day. The duration of said time-interval is 0.5 seconds. Alternatively, said duration is relatively short, e.g. less than 10 milliseconds, e.g. 1 millisecond. Yet alternatively, said duration of said time-interval may be proportional to a known capacitor size of each respective load of said at least one load, which may be detected by the controller and/or found in memory storing information on a capacitor in relation to a detected respective load of the at least one load.

Subsequently, since the power bus 20 is adapted here to communicate data between the power supply 10 and one or more respective load 111, 112 of said at least one load 11, the controller 30 is able to send a cryptographic message, over the power bus 20, to said one or more respective authorized loads 111, 112 of said at least one load 11. Alternatively, said power bus may be adapted to communicate data, or send said cryptographic message, to each respective load of said at least one load (i.e. e.g. to all three sensors depicted here, also the unauthorized sensor, which however will not be able to decrypt any instruction provided by said message). Hereby, the cryptographic message according to the invention may be sent either via broadcast over the power bus to the at least one load, or alternatively via unicast to the one or more respective load of said at least one load separately. Further alternatively, said controller conveys the cryptographic message. Said cryptographic message may alternatively be conveyed or sent via a single hop or a plurality of hops. For example, a load may forward said cryptographic message to another load. Therefore, the controller 30 may comprise means or intelligence for encrypting messages/ data. For example, the encrypted instruction may be encrypted with a secret key, and may be only be decrypted with knowledge about said secret key. Said secret key may be present in an authorized load, for example because the authorized load may be manufactured by the same manufacturer of the lighting device or e.g. a third party licensed to equip their products with said secret key. The controller may alternatively be equipped with a license checker configured to assess a license of the at least one load.

Still referring to FIG. 1, said cryptographic message is sent before the initiation of said time interval. The cryptographic message comprises an encrypted instruction for said one or more respective authorized load 111, 112 of said at least one load 11 to consume, when decrypted, a predetermined amount of power from the power bus 20 during said selected time-interval. Therefore, said one or more respective authorized load 111, 112 of said at least one load 11 is able to read the cryptographic message and decrypt said instruction to consume the predetermined amount of power during said selected time-interval. This means that the first respective load 111, the microphone 111, and the second respective load 112, the PIR sensor 112, are able to decrypt the instruction and will consume the instructed predetermined amount of power during said selected time-interval; whereas the third respective load 113, the unauthorized microwave sensor 113, is not consuming the instructed predetermined amount of power during said selected time-interval.

As mentioned, alternatively, said cryptographic message may be sent to each respective load of said at least one load. As a result, in such alternative example, irrespective of being authorized or unauthorized, each respective load 111, 112, 113 of said at least one load 11 receives and observes said cryptographic message. However, the cryptographic message comprises the encrypted instruction. Therefore, only an authorized respective load 111, 112 of said at least one load 11 is able to read the cryptographic message and decrypt said instruction to consume the predetermined amount of power during said selected time-interval. The unauthorized load 113 cannot decrypt said encrypted instruction in the cryptographic message, hence will not be able to consume said predetermined amount of power during said time-interval.

In alternative examples, said controller may create and/or send said cryptographic message to one or more (or alternatively each) respective load accordingly, but without an explicit encoded instruction to consume the amount of power. That is: Said amount of power to be consumed may be determined, e.g. by each respective load of said at least one load itself, after reception of the cryptographic message (by said each respective load) which cryptographic message is merely indicative an instruction for said one or more (or alternatively each) respective load of said at least one load to consume an amount of power from the power bus during said selected time-interval. Thus, said cryptographic message may be a trigger signal, which intelligence of the respective load reads and uses to consume an amount of power, which amount of power is self-determined (by said each respective load) and communicated back to the controller so as to inform the controller what the amount of power consumed has been. In this way the controller determines said power consumed.

Further, the controller 30 is adapted to determine the power consumed from the power bus 20 during said selected time-interval. If then the determined power is different to a sum of each predetermined amount of power sent via the cryptographic message to said one or more respective load 111, 112, of at least one load 11, the controller 30 determines a condition. Said determining is done by measuring. Hence, the controller measures the power consumed from the power bus during said time-interval. The condition is hereby indicative of that the power consumption over the power bus deviates from the power consumption instructed to authorized loads or (pre-)agreed with authorized loads. Hence, said condition may indicate an unauthorized load (i.e. the microwave sensor 113) drawing power from the power bus 20 during said selected time-interval.

Again alternatively, referring to the example wherein the cryptographic message is conveyed to each respective load of the at least one load: If then the determined power is different to a sum of each predetermined amount of power sent via the cryptographic message to each respective load of at least one load the controller determines a condition.

Still referring to FIG. 1. For example: The microphone 111, the PIR sensor 112, the microwave sensor 113 consume each 2 Watt in normal operation. The encrypted instruction of the cryptographic message sent by the controller 30 instructs a load which is able the decrypt said instruction to consume a predetermined amount of 0.01 Watt during said selected time-interval. As the microphone 111 and the PIR sensor 112 are authorized, only the microphone 111 and the PIR sensor will follow up on the encrypted instruction sent by the controller 30 with the cryptographic message; hence only the microphone 111 and the PIR sensor 112 will consume the predetermined amount of power of 0.01 Watt during said selected time-interval. The microwave sensor 113 is not addressed with said message, but may observe (or may be able to overhear) the message sent over the power bus 20, but is unauthorized and does therefore not comprise means to decrypt said encrypted instruction. The microwave sensor 113 is unaware of the exact start and end points of the time-interval, and also unaware of the exact nature of any instructions that apply during the time-interval and will therefore remain consuming 2 watt of power during said selected time-interval. As a result, during said selected time-interval, the controller 30 measures a power consumption of 2.02 Watt over the power bus. However, the sum of each predetermined amount of power sent via the cryptographic message to said one or more respective load 111, 112 of at least one load 11, i.e. to each one of the authorized sensors, is 0.02 Watt. Now, the measured power of 2.02 Watt is different to 0.03 Watt during said selected time-interval. The controller 30 will therefore determine a condition, which condition is indicative of an unauthorized load (i.e. the microwave sensor 113) existing and drawing power from the power bus 20 during said selected time-interval.

Consequently, to cope with such an undesired condition, in response to determining said condition, the controller 30 may be arranged to perform at least one action. Such an action may for example be a corrective action or a reporting action.

Here, the at least one action performed by the controller 30 is first to send a notification signal to a transceiver (not depicted), which transceiver forwards said notification signal via wireless communication in the form of a notification message. Said notification message is received on a mobile device of e.g. the lighting device owner. The lighting device owner will therefore be warned that an unauthorized device may be in electrical connection with a power output of the lighting device.

Second, the controller 30 changes the amount of power fed to the power by cutting said power into half. This ensures that none of the loads 111, 112, 113 can operate according to its normal operation, which for the unauthorized load 113 means that its hazardous effects are controlled or may be 'reduced'. Alternatively, said at least one action may comprise changing an amount of power fed to the power bus by the power supply, wherein said amount of power fed to the power bus by the power supply may be zero. As an unauthorized load may not be safeguarding safety standards, such a change in the amount of power fed to the power bus being zero may be advantageous, because power fed to the power bus may be shut off.

Third, here, the at least one action is in respect of the primary load. Namely, the controller 30 instructs the TLED to oscillate the light intensity of its light output, hence providing a blinking light output. Such a blinking light output may be indicative to any one observing said TLED that the lighting device comprises an unauthorized load electrically connected thereto.

Figure 2:
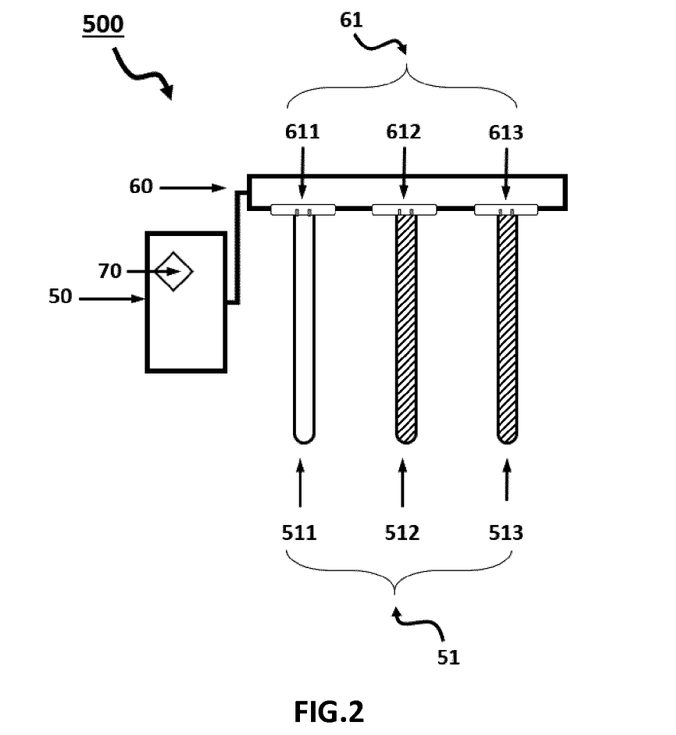
FIG. 2 depicts schematically an embodiment of a lighting device.

FIG. 2 depicts schematically, by non-limiting example, embodiment of a lighting device 500 according to the invention, which is partly similar to the embodiment depicted in FIG. 1. Again, the lighting device 500 comprises a power supply 50, a controller 70 and a power bus 60. The power supply 50 is adapted to feed the power bus 60 and comprises the controller 70. The power bus 60 comprises a plurality of power outputs 61, which are sockets for attaching a LED module, wherein at least one power output 611 612 613 of said plurality of power outputs 61 is adapted to electrically connect to respectively at least one load 51, which at least one load 51 is at least one LED module 511, 512, 513. Namely, a first LED module 511 which is authorized, a second LED module 512 which is not authorized, a third LED module 513 which is not authorized; wherein non-authorization may be because such LED modules are of a competitor. For example a competitor who has failed to incorporate safety measures into the LED module design that are considered to be crucial in order to protect against hazardous situations. Alternatively, said LED module may be any other light source, actuator or sensor. Such an actuator may for example be one of: a speaker, an RF beacon, an IR beacon, a VLC beacon, a display device, a mechanical actuator, a RADAR, a LIDAR, or a fan, etc. Such a light source may for example be a LED light source, an OLED light source, a semiconductor light source, a T-LED, a LED module, a LED strip, a conventional light source, an incandescent lamp, a fluorescent lamp, a retrofit lamp, a spot light, a halogen spot, etc.

Similarly, as seen before, the power bus 60 is adapted to communicate data between the power supply 50 and each respective load 511, 512, 513 of said at least one load 51 via PLC. Again, it is an objective to determine such an unauthorized device or load and act accordingly. Thus, the controller 70 selects a time-interval in the future. This time-interval is randomly chosen in time. The duration of said time-interval is 5 milliseconds. The controller 70 sends a cryptographic message to each LED module 511 512 513 before initiation of said time-interval. The cryptographic message comprises an encrypted instruction for each respective LED module 511 512 513 to consume a predetermined amount of power from the power bus 60 during said selected time-interval. Only the authorized first LED module 511 is authorized and comprises means (e.g. secret key) to decrypt said instruction. The unauthorized LED modules 512, 513 are not able to decrypt said instruction.

The predetermined amount of power is zero. Hence, if all LED modules electrically connected to the bus 60 are authorized, no power will be consumed over the power bus 60 during said selected time-interval. The controller 70 measures the power consumed from the power bus 60 during said selected time-interval. In this case, the first LED module 511 will consume zero power, while the second LED module 512 and the third LED module 513 will consume a power above zero. Therefore, the controller 70 determines a condition, because said measured power consumed from the power bus 60 (power is non-zero during said time-interval) is different to a sum of each predetermined amount of power sent via the cryptographic message to each respective LED module 511 512 513 (power has to be zero during said time-interval). This condition is indicative of an unauthorized load electrically connected to said power bus 60, in response to determining said condition, the controller 70 performs at least one action. Here, the at least one action is to shut off power to the power bus 60 completely. This may safeguard safety. Alternatively, as mentioned before, other actions such as notification or providing different amounts of power via the power bus may be envisioned, e.g. providing an oscillating power via the power bus so as to make the LED modules emit blinking light, or send a code via VLC indicating that an unauthorized condition is determined.

In a paragraph, note that the above example, where the predetermined amount of power is zero, works for detecting unauthorized loads that are connected in parallel to the bus with authorized loads. If an unauthorized load is connected in series with an authorized load (in case this type of attack is physically possible given the system design), then the example detection method with a predetermined amount of power of zero will not work, as the connection in series will cause the unauthorized load to also detect a zero amount of power during the time-interval, so that it becomes invisible to the power measurement. To detect unauthorized loads connected in series (if such detection is a concern), the controller can specify that a non-zero amount of power should be used by the authorized loads (or by different authorized loads during different time-intervals), so that the effect of the unauthorized load connected in series on the total amount of power consumed from the bus will not be hidden and can be observed. Such a non-zero amount could be specified as a number of milliWatts or milliAmperes, but it might also be specified as an instruction to the load to create a certain specified Ohmic resistance between its power input terminals that connect to the power bus.

Advanced unauthorized loads may attempt to detect the start of a time-interval by looking for transient changes in the bus supply voltage, and on detecting such a transient, take the measure of reducing the power they consume from the bus to zero, for an amount of time that is longer than the time of the maximum time-interval. Some counter-measures against such advanced loads are first, the random injection of transients by the power supply, and, second, more complex instructions to authorized loads for their behavior during the time-interval, that cause them to consume levels of power that change during the time interval, creating complex power consumption signatures.

Figure 3:
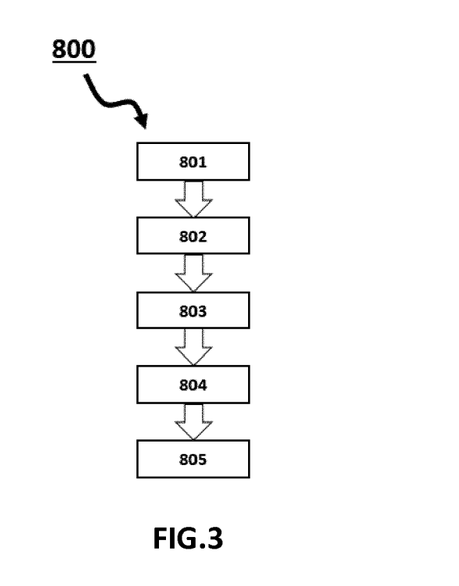
FIG. 3 depicts schematically, within a flowchart, an embodiment of a method of performing at least one action.

FIG. 3 depicts schematically, within a flowchart, an embodiment of a method 800 of performing at least one action. The method 800 being performed by a controller comprised by a power supply of a lighting device, such as the embodiments depicted in FIG. 1 and FIG. 2. The lighting device comprises the power supply and a power bus, wherein the power supply is adapted to feed the power bus, wherein the power bus comprises a plurality of power outputs.

The method 800 comprises: 801 selecting a time-interval. Such a time-interval may be a future time-interval, which in some examples is randomly selected in time, but alternatively is selected periodically in time. The method further comprises the step of 802 of conveying, before initiation of said time-interval, a cryptographic message to one or more respective load of at least one load, wherein the at least one load is respectively electrically connected to at least one power output of said plurality of power outputs, wherein the cryptographic message is indicative of an encrypted instruction for one or more respective load of said at least one load to consume, when decrypted, a predetermined amount of power from the power bus during said selected time-interval. Alternatively, said cryptographic message may be sent to said one or more respective load (or each respective load) and may comprise said instruction. Such a load may for example be a sensor, a light source, or another actuator. The method further comprises step 803 of measuring the power consumed from the power bus during said selected time-interval; and step 804 of determining a condition when said measured power consumed from the power bus is different to a sum of each predetermined amount of power conveyed (or e.g. alternatively sent) via the cryptographic message to said one or more respective load of said at least one load. Finally, step 805, in response to determining said condition, performing the at least one action. The at least one action comprises, in the present embodiment, sending a notification signal and/or comprises changing a power fed to the power bus by the power supply.

The invention claimed is:

1. A lighting device comprising a power supply, a controller and a power bus;
   wherein the power supply is adapted to feed the power bus;
   wherein the power bus comprises a plurality of power outputs, wherein at least one power output of said plurality of power outputs is adapted to electrically connect to respectively at least one load;
   wherein the controller is arranged to:
      select a time-interval;
      convey a cryptographic message to one or more respective load of said at least one load before initiation of said time-interval, wherein the cryptographic message is indicative of an instruction for said one or more respective load of said at least one load to consume an amount of power from the power bus during said selected time-interval;
      determine the power consumed from the power bus during said selected time-interval;
      determine a condition indicative of an unauthorized load connected to said power bus when said determined power consumed from the power bus is different to a sum of each amount of power conveyed via the cryptographic message to said one or more respective load of said at least one load;
      in response to determining said condition, perform at least one action.

2. The lighting device according to claim 1, wherein a duration of said time-interval is less than 1 second, preferably less than 10 milliseconds.

3. The lighting device according to claim 1, wherein the controller is arranged to select said time-interval randomly in time.

4. The lighting device according to claim 1, wherein the power bus is adapted to communicate data between the power supply and each respective load of said at least one load.

5. The lighting device according to claim 1, wherein the power supply comprises the controller, and the controller is arranged to measure the power consumed from the power bus during said selected time-interval.

6. The lighting device according to claim 1, wherein the at least one load comprises a sensor, or wherein the at least one load comprises a light source.

7. The lighting device according to claim 1, wherein the at least one action comprises sending a notification signal.

8. The lighting device according to claim 1, wherein the at least one action comprises changing an amount of power fed to the power bus by the power supply.

9. The lighting device according to claim 1, wherein the amount of power is less than 0.01 Watt.

10. A lighting system comprising:
    the lighting device according to claim 1, and
    at least one load;
    wherein each respective load of the at least one load is electrically connected to respectively the at least one power output of said plurality of power outputs.

11. The lighting system according to claim 10, wherein the at least one load comprises a light source and/or a sensor.

12. The lighting system according to claim 10, wherein the lighting device further comprises a primary power output adapted to connect to a primary load, wherein the power supply is further adapted to feed the primary power output;

wherein the lighting system further comprises the primary, wherein the primary load is a light source.

13. A method of performing at least one action, the method being performed by a controller comprised by a lighting device, wherein the lighting device comprises a power supply and a power bus, wherein the power supply is adapted to feed the power bus, wherein the power bus comprises a plurality of power outputs, the method comprising:

selecting a time-interval;

conveying, before initiation of said time-interval, a cryptographic message to one or more respective load of at least one load, wherein the at least one load is respectively electrically connected to at least one power output of said plurality of power outputs, wherein the cryptographic message is indicative of an instruction for said one or more respective load of said at least one load to consume a predetermined amount of power from the power bus during said selected time-interval;

determining the power consumed from the power bus during said selected time-interval;

determining a condition indicative of an unauthorized load connected to said power bus when said determined power consumed from the power bus is different to a sum of each amount of power conveyed via the cryptographic message to said one or more respective load of said at least one load;

in response to determining said condition, performing the at least one action.

14. The method according to claim 13, wherein the at least one action comprises sending a notification signal and/or comprises changing a power fed to the power bus by the power supply.

15. A non-transitory computer readable medium comprising computer executable instructions that when executed perform the method as defined in claim 12.

* * * * *